United States Patent [19]

Cummins, Jr.

[11] 4,328,666
[45] May 11, 1982

[54] HEAT RECOVERY ANTI-ICING SYSTEM

[75] Inventor: James R. Cummins, Jr., Ballston Lake, N.Y.

[73] Assignee: General Electric Company, Schenectady, N.Y.

[21] Appl. No.: 162,783

[22] Filed: Jun. 25, 1980

[51] Int. Cl.³ .............................................. F02C 7/047
[52] U.S. Cl. ............................................... 60/39.09 D
[58] Field of Search ......... 60/39.07, 39.09 D, 39.51 R

[56] References Cited

U.S. PATENT DOCUMENTS 3,422,800  1/1969  Haye .................................. 60/39.07
3,703,807  11/1972  Rice ................................ 60/39.18 B

FOREIGN PATENT DOCUMENTS 1064268  10/1979  Canada ......................... 60/39.09 D

OTHER PUBLICATIONS

Tatge et al., *Gas Turbine Inlet Air Treatment*, General Electric Publication, GER-2490D, Oct. 1980.

Primary Examiner—Louis J. Casaregola
Attorney, Agent, or Firm—Jerome C. Squillaro

[57] ABSTRACT

A heat recovery anti-icing system is disclosed. The heat recovery system includes a blower which removes air from the air flow path of a combustion turbine power generating system and circulates the air through a heat exchanger located in the exhaust stack of the combustion turbine. The heated air circulating through the heat exchanger is returned to an inlet filter compartment in the air flow path so as to maintain the temperature of the air in the inlet filter compartment at an elevated level.

13 Claims, 5 Drawing Figures

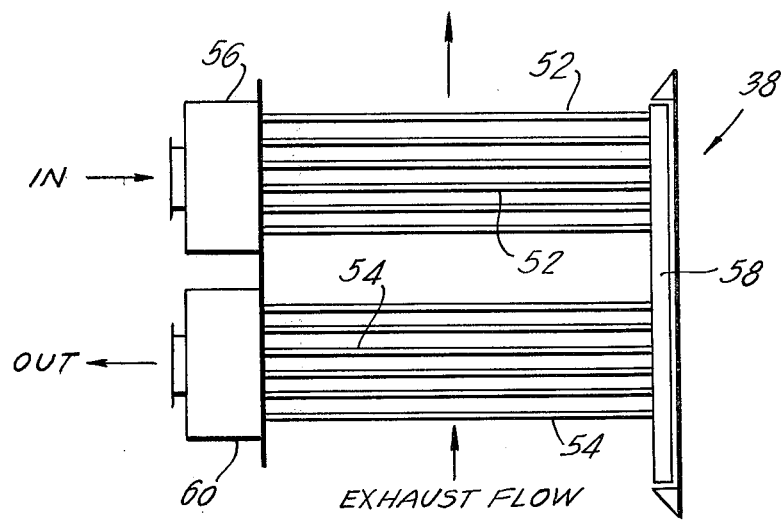
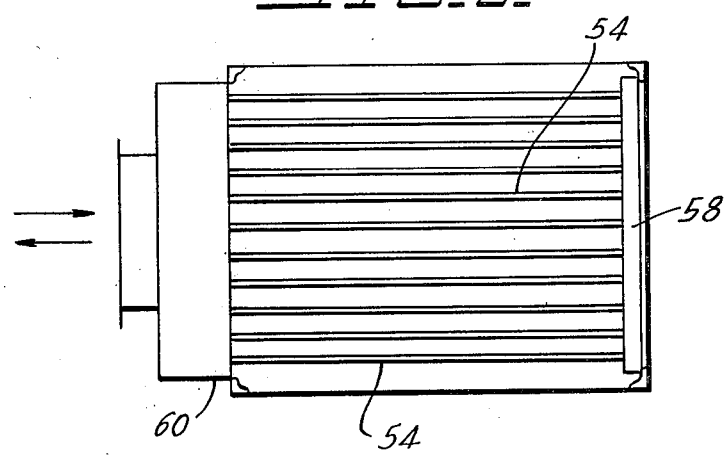

HEAT RECOVERY ANTI-ICING SYSTEM

BACKGROUND OF THE INVENTION

The present invention is directed towards a heat recovery anti-icing system and more particularly to an anti-icing system which maintains the temperature of air in the inlet filter compartment of a combustion or gas turbine power generating system at an elevated level.

Anti-icing systems of the foregoing type are well known. Such systems fall into three primary categories: compressor bleed systems, exhaust recirculation systems and heat exchanger systems. Compressor bleed systems utilize a small percentage of compressor discharge air (typically 500° to 800° F.) for direct-mix heating with the cold air located in the inlet filter compartment. While such a system is relatively inexpensive to construct, it exhibits significantly lower performance characteristics at moderately cold temperature (0° F. to 40° F.) than other systems.

Exhaust gas recirculation systems utilize a portion of the hot exhaust air from the turbine for direct-mix heating with the cold air located in the inlet filter compartment. The primary drawback of this system is that the recirculated gas contains moisture which is reintroduced into the air flow system. As a result of this moisture, it is necessary to operate the exhaust gas recirculation system in a full heating mode wherein the inlet air is heated to a fixed temperature above freezing.

Heat exchanger systems utilize exhaust gas from the turbine to indirectly heat the air being applied to the turbine compressor using a heat exchanger. Since no additional moisture is introduced into the air flowing into the compressor, the system may be operated in a limited heating mode wherein the air in the inlet filter compartment is heated by a limited temperature increment.

In prior art heat exchanger systems, the heat exchanger is located between the inlet filter compartment and the compressor. Hot exhaust gases located in the exhaust stack are applied to the heat exchanger via a control valve for indirect heating of the air flowing into the compressor. While such a system has been generally satisfactory, it exhibits several drawbacks. For example, the heat exchanger is located some distance from the exhaust stack and therefore, the exhaust gases leaving the heat exchanger are relatively cool and cause condensation of both water and sulfuric acid. Additionally, the pressure losses at both the exhaust and the inlet are relatively high.

BRIEF DESCRIPTION OF THE INVENTION

In an effort to overcome the foregoing drawbacks of the prior art anti-icing systems, the present invention relates to an anti-icing system utilizing a heat exchanger located in the exhaust stack of a gas turbine to avoid condensation in the heat exchanger while the air in the air inlet filter compartment is maintained at satisfactory temperature levels to avoid icing. The anti-icing system may be operated in a limited heating mode wherein the temperature in the inlet filter compartment is heated by a predetermined temperature increment.

In accordance with the present invention, a blower is provided to remove at least a portion of the air from the inlet air system, e.g. the filter compartment or silencer duct, and to pass that air through the heat exchanger. Since the blower is located in the feed line from the inlet filter compartment to the heat exchanger, the air passing through the blower is at relatively low temperature levels. This is advantageous since it enables the blower to be formed of low temperature materials.

Another advantage of the heat recovery system of the arrangement of the present invention is that the pressure losses at the exhaust are relatively low.

BRIEF DESCRIPTION OF THE DRAWINGS

For the purpose of illustrating the invention, there is shown in the drawings one embodiment which is presently preferred; it being understood, however, that this invention is not limited to the precise arrangement and instrumentality shown.

FIG. 4 is an elevational view of the heat exchanger of FIG. 1.

FIG. 5 is a plan view of the heat exchanger of FIG. 4.

DETAILED DESCRIPTION OF THE INVENTION

Figure 1:
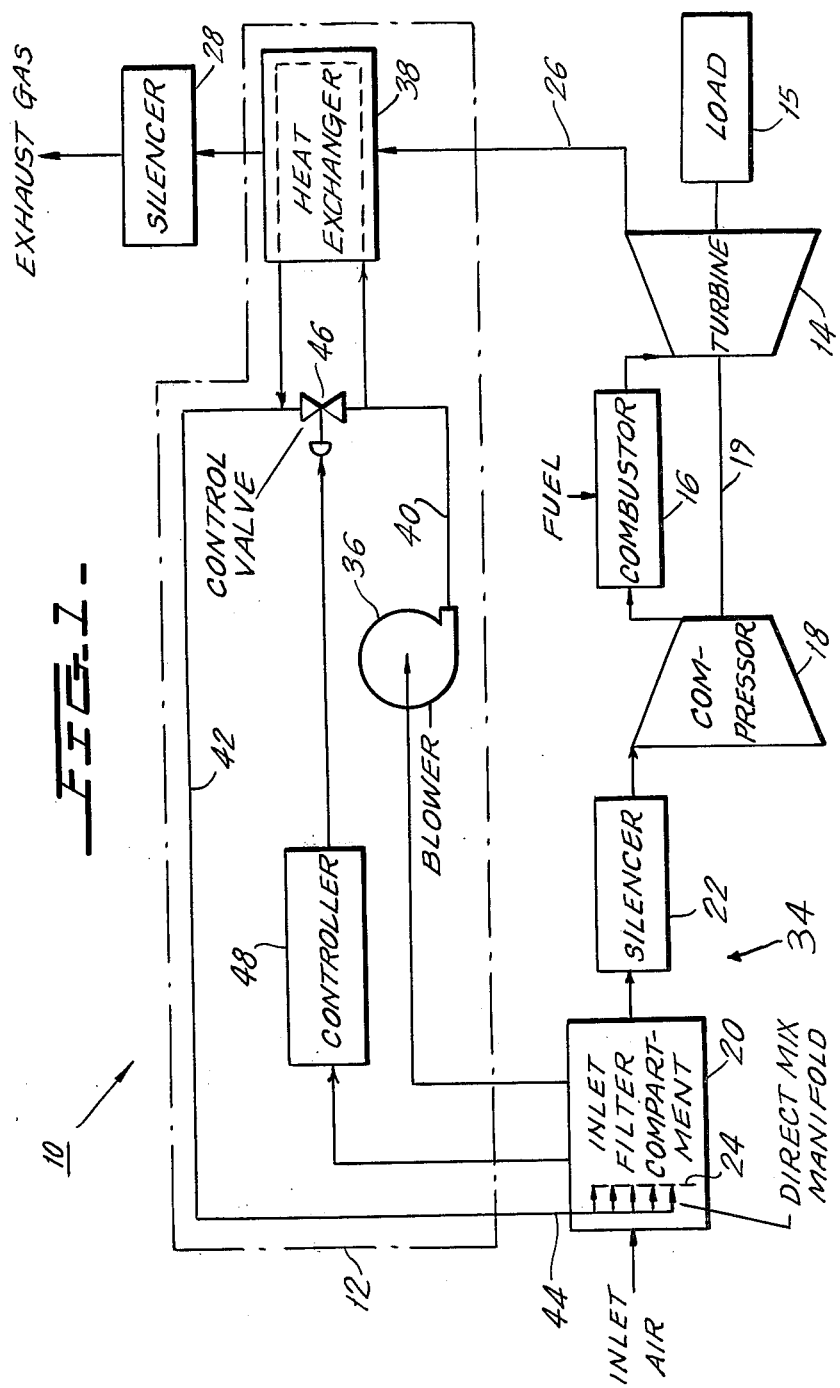
FIG. 1 is a schematic diagram of a combustion turbine power generating system incorporating the heat recover system of the present invention.

Referring now to the drawings, wherein like numerals indicate like elements, there is shown in FIG. 1, by way of example, a combustion or gas turbine power generating system 10 incorporating a heat recovery anti-icing system constructed in accordance with the principles of the present invention and designated generally as 12. Combustion turbine system 10 includes a gas turbine 14 which supplies output power to a load 15, such as an electrical generator or a mechanical drive system. The gas turbine 14 is powered by hot gases generated in a combustor 16 as a result of the combustion of liquid or gas fuel which is supplied to combustor 16 from an appropriate fuel source (not shown). These hot gases of combustion pass through gas turbine 14 at a high velocity and are discharged through an exhaust stack 26 which preferably contains a silencer 28.

To enable proper combustion of the liquid or gas fuel, combustor 16 receives compressed air from a compressor 18. Compressor 18 is preferably driven by turbine 14 from a common shaft 19. The compressor 18 receives ambient air collected in an inlet system 34 comprising an inlet filter compartment 20 preferably including one or more filters 24 for filtering the air and an inlet air silencer 22.

Figure 2:
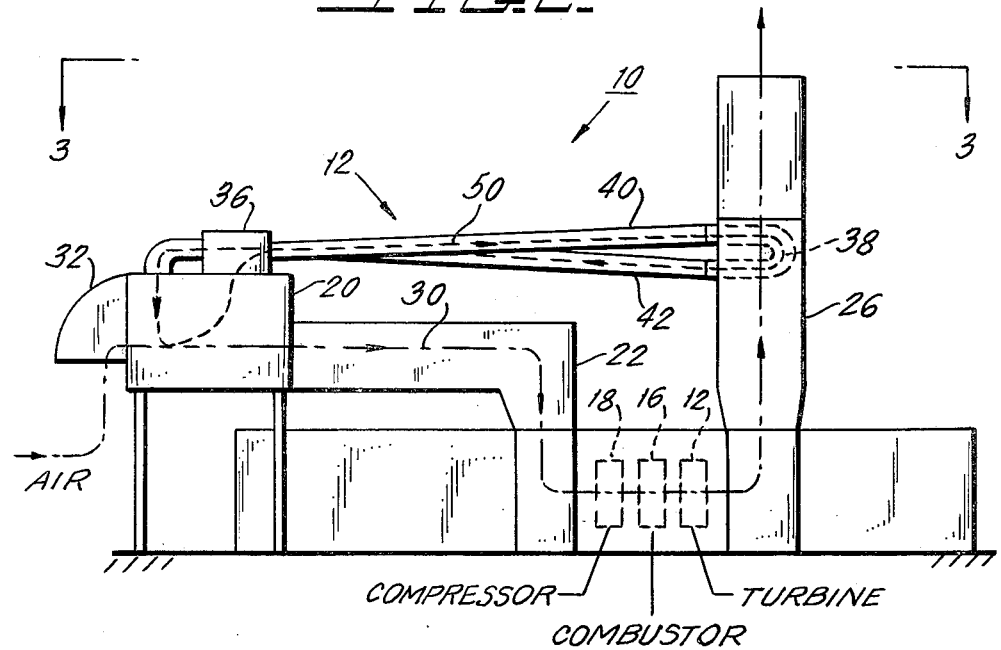
FIG. 2 is an elevational view illustrating one embodiment of the system of FIG. 1.
Figure 3:
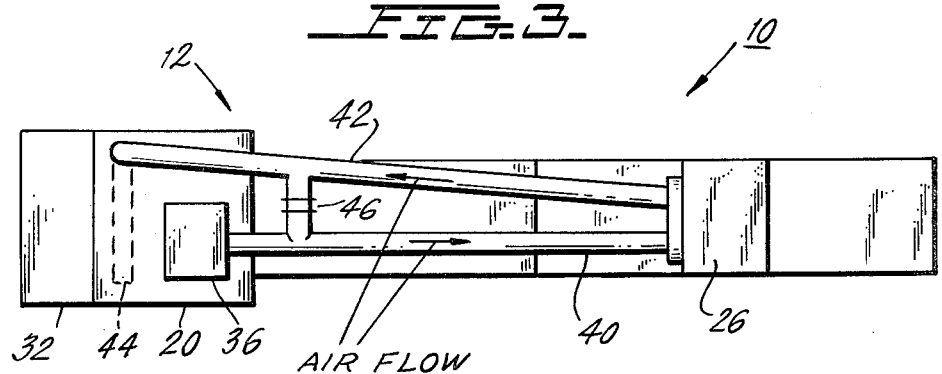
FIG. 3 is a plan view of the system of FIG. 2.

In accordance with one embodiment of the present invention, the path of air flow through the combustion turbine system 10 is best illustrated in FIG. 2 in which the dashed line 30 illustrates the main flow of air through combustion turbine system 10. As shown in FIG. 2, ambient air enters inlet filter compartment 20 via a snow hood 32 elevated above ground level. Air in compartment 20 flows through inlet air silencer 22 into compressor 18 wherein it is compressed and applied to combustor 16. The air supports combustion of the liquid or gas fuel supplied to combustor 16 and the combustion products thereof are applied as hot gases to turbine 14. The hot gases leaving turbine 14 are exhausted, for example, via a vertically extending exhaust stack 26. If combustion turbine system 10 is operated in an area where the ambient air temperature is below freezing, the air flowing along portions of path 30 may be sufficiently cold to permit the formation of condensation or ice crystals. To avoid this possibility, the heat recovery anti-icing system 12 of the present invention uses the heat contained in the exhaust gases in exhaust stack 26 to raise the temperature of the air in compartment 20. The structure and operation of the heat recovery anti-icing system 12 of the present invention may best be understood with reference to FIGS. 1 through 3 wherein the dashed line 50 of FIG. 2 represents the flow path of air which is heated by heat recovery system 12. A small percentage (e.g., 10%) of the air flowing along the air flow path 30 is removed, for example, from compartment 20 by a blower 36 located on top of inlet compartment 20 and applied to a heat exchanger 38, via conduit 40. Heat exchanger 38 is located in exhaust stack 26 and brings the air removed from inlet filter compartment 20 into thermal contact with the hot exhaust gases (approximately 500° to 1000° F.) in exhaust stack 26. As a result, a substantial portion of the heat contained in the exhaust gases is transferred to the air circulating through heat exchanger 38.

The air in heat exchanger 38 is returned to the inlet side of compartment 20 by a return conduit 42 and is recirculated either in inlet filter compartment 20 by a direct mix manifold 44 located upstream of filter 24. As a result, the air in filter compartment 20 is heated by the warm air returning from heat exchanger 38 and the temperature of the air in compartment 20 remains sufficiently high to prevent undesirable condensation of the water or ice formation.

In the preferred embodiment, a cut off valve 46 extends between conduits 40, 42 to permit adjustment of the percentage of air which passes through heat exchanger 38. A controller 48 (see FIG. 1) monitors the temperature (by thermal couples, for example) in inlet filter compartment 20 and controls the position of valve 46 (and therefore the flow of air through heat exchanger 38) in a manner which maintains the temperature of the air in inlet filter compartment 20 within a desirable range.

Referring now to FIGS. 4 and 5, a heat exchanger 38, useful in practising the present invention, includes a first plurality of inlet conduits 52 and a second plurality of outlet conduits 54 all of which extend in a direction perpendicular to the direction of flow of exhaust gas through stack 26 and all of which serve to transfer heat from the exhaust gases to the air circulated through the heat exchanger 38. Inlet conduits 52 extend between an inlet header 56, which is coupled to conduit 40, and an intermediate header 58. Outlet conduits 54 extend between intermediate header 58 and an outlet header 60, which is coupled to conduit 42. Air collected in inlet header 56 is distributed through inlet conduits 52 by the force supplied by blower 36 and is collected in intermediate header 58. While passing through conduits 52 the air is heated by the exhaust gases in exhaust stack 26. The partially heated air collected in intermediate header 58 is further distributed through outlet conduits 54, where it is again heated, and is collected in outlet header 60. The heated air in outlet header 60 is returned to inlet filter compartment 20 via conduit 42 and heats the air located in compartment 20.

Those skilled in the art can appreciate that while the embodiment of the invention illustrated in FIG. 2 provides for removal of air along the flow path 50 at the inlet filter compartment 20, the air could also be extracted from the duct work between the inlet filter compartment 20 and the inlet air silencer 22 or from the duct work between the inlet air silencer 22 and the inlet to the compressor 18. Any of these locations are equally suitable for extraction purposes, with the point of extraction being determined by other factors relating, for example, to the physical arrangement of the system components.

It should also be noted that the heated air returned in conduit 42 to the manifold 44 is located upstream at the filter 24 so that the filter itself is heated to prevent the formation of ice on the filter elements.

While the invention is described with reference to an air extraction of approximately ten percent, it should be appreciated that the amount of air extraction will depend on several factors such as the efficiency of the heat exchanger 38, the desired heating rise and obviously the air losses caused by leaks in the air flow path. Therefore, air extractions of between approximately 1 and 30 percent are possible to achieve the desired anti-icing function.

In practising the invention, the anti-icing system is operated preferably with a limited heating rise of approximately 20° F. for ambient conditions below 20° F. and full heating to 40° F. for ambient conditions above 20° F. In this way, the combustion turbine power generating system is operable over a wide range of ambient conditions without icing problems.

In summary, the anti-icing system of the present invention utilizing a heat exchanger provides numerous advantages over a compressor bleed system and exhaust recirculation system. For example, by locating the blower 36 downstream of the anti-icing manifold 44, it is protected from icing. Also, the heated air is distributed in front of the inlet filters 24 where the heated air is mixed with the incoming air. Since the heated air is dry, only limited heating of the incoming air is required to prevent condensation and icing. Additionally, since the heat exchanger is located in the exhaust stack 26 where high temperatures exist, there is no condensation on the heat exchanger and also the pressure drop occurs in the exhaust rather than at the inlet, minimizing the loss in gas turbine output or efficiency.

The present invention may be embodied in other specific forms without departing from the spirit or essential attributes thereof and, accordingly, reference should be made to the appended claims, rather than to the foregoing specification as indicating the scope of the invention.

What is claimed is:

1. A heat recovery anti-icing system for use with a combustion turbine system of the type including a gas turbine, a combustor for supplying hot gases to said turbine, a turbine compressor supplying compressed air to said combustor, an air flow path including an inlet filter compartment for receiving ambient air which is supplied to said compressor and an exhaust stack expelling said hot gases after they pass through said turbine, said system comprising:

a heat exchanger located in said exhaust stack;

blower means for removing at least some of the air located in said air flow path upstream of said compressor and supplying said air to said heat exchanger, said heat exchanger adapted to transfer heat from said hot gases located in said exhaust stack to said removed air supplied by said blower means; and conduit means for returning said removed air supplied by said blower means to said inlet filter compartment after said removed air has been heated in said heat exchanger.

2. The system of claim 1, wherein said inlet filter compartment has a filter located therein and wherein said conduit means returns said removed air to said inlet filter compartment at a location upstream from said filter with respect to the flow of ambient air through said compartment so that said returned air passes through said filter.

3. The system of claim 1 wherein the air removed from said air flow path by said blower means is removed from said inlet filter compartment.

4. The system of claim 1 wherein said air flow path includes an inlet air silencer downstream of said inlet filter compartment and the air removed from said air flow path by said blower means is removed between said inlet filter compartment and said inlet air silencer.

5. The system of claim 1 wherein said air flow path includes an inlet air silencer downstream of said inlet filter compartment and the air removed from said air flow path by said blower means is removed between said inlet air silencer and said compressor.

6. The system of claim 1, further including exhaust damper means for adjusting the amount of said removed air which is applied to said heat exchanger.

7. The system of claim 6, further including control means for controlling the operation of said exhaust damper means as a function of the temperature of said air in said inlet filter compartment.

8. The system of claim 1, wherein said blower means comprises:
an air blower for removing at least some of the air located in said air flow path;
an inlet conduit directing said removed air from said blower to said heat exchanger.

9. The system of claim 8, further including a bypass valve located between said inlet conduit and said conduit means, said bypass valve controlling the amount of said removed air which is supplied to said heat exchanger as a function of the position of said valve.

10. The system of claim 9, further including control means for adjusting the position of said valve as a function of the temperature of the air in said inlet filter compartment.

11. The system of claims 1, 6 or 9, wherein said heat exchanger comprises a plurality of air inlet pipes and a plurality of air outlet pipes extending through said exhaust stack.

12. The system of claim 11, wherein said air inlet pipes and said air outlet pipes extend generally parallel to each other and generally perpendicular to the flow of said hot gases through said exhaust stack.

13. The system of claim 12, wherein:
said heat exchanger further includes an air inlet header, an air outlet header and an intermediate header;
each of said air inlet pipes extends between said air inlet header and said intermediate header; and
each of said air outlet pipes extends between said intermediate header and said air outlet header.

* * * * *